United States Patent [19]

Ing et al.

[11] Patent Number: 5,129,817
[45] Date of Patent: Jul. 14, 1992

[54] GRIPPER BUSHING ASSEMBLY FOR AN APPARATUS FOR MAKING PLASTIC ARTICLES

[75] Inventors: Ronald Ing, Brampton; Robert D. Schad, Toronto, both of Canada

[73] Assignee: Husky Injection Molding Systems Ltd., Bolton, Canada

[21] Appl. No.: 667,680

[22] Filed: Mar. 11, 1991

[51] Int. Cl.⁵ .............................................. B29C 45/68
[52] U.S. Cl. ................................. 425/589; 425/4519; 425/590; 425/595
[58] Field of Search ................... 425/589, 590, 450.1, 425/451, 451.3, 451.7, 451.9, 595

[56] References Cited

U.S. PATENT DOCUMENTS

| | | | |
|---|---|---|---|
| 2,691,799 | 10/1954 | Moeller | 425/450.1 |
| 3,183,555 | 5/1965 | Siegel | 425/441 |
| 3,420,144 | 1/1969 | Berry | 91/45 |
| 3,938,362 | 2/1976 | Falk et al. | 72/225 |
| 3,995,534 | 12/1976 | Rastetter | 92/27 |
| 4,264,229 | 4/1981 | Falk et al. | 403/5 |
| 4,509,910 | 4/1985 | Petersen | 425/451.9 |
| 4,693,448 | 9/1987 | Proksa et al. | 425/589 |

FOREIGN PATENT DOCUMENTS

| | | |
|---|---|---|
| 2517997 | 11/1976 | Fed. Rep. of Germany . |
| 3510643 | 9/1986 | Fed. Rep. of Germany . |
| 149088 | 10/1989 | Japan . |
| 1245999 | 10/1989 | Japan . |
| 2172711 | 7/1990 | Japan . |
| 8807447 | 10/1988 | PCT Int'l Appl. . |

Primary Examiner—Tim Heitbrink
Attorney, Agent, or Firm—Bachman & LaPointe

[57] ABSTRACT

The present invention relates to improved gripper bushing assemblies for use with injection molds, molding machines and other devices. In a first embodiment, the gripper bushing assemblies include an elongated flexible gripping sleeve positioned about a column member such as a tiebar. The sleeve is secured to a member such as a moving platen and is used to clamp the platen to the tiebar in a desired location. The gripper bushing assemblies further include one or more spacers intermediate the sleeve and the platen. The spacers engage the sleeve via a mechanical interlock. The sleeve and spacer(s) are capable of accommodating tiebar stretching which may occur as a result of clamping forces being applied to the mold via the platen. In a second embodiment, the spacer(s) are omitted and the gripping sleeve has a male thread which engages a female thread on the platen.

23 Claims, 6 Drawing Sheets

GRIPPER BUSHING ASSEMBLY FOR AN APPARATUS FOR MAKING PLASTIC ARTICLES

BACKGROUND OF THE INVENTION

The present invention relates to improved gripper bushing assemblies for use with injection molds and molding machines. The gripper bushing assemblies of the present invention are designed for fast cycling applications.

The concept of a gripping bushing for selectively gripping or releasing a rotating or sliding shaft is well known in the art. Early versions of these gripping bushings used radial segments that were pressed into engagement with the shaft by springs or tapered sleeves and were released by hydraulic pressure. U.S. Pat. Nos. 2,691,799 to Moeller; 3,420,144 to Berry; and 3,995,534 to Rastetter and German Offenlegungsschrift 35 106 43 to Sitema illustrate this type of gripper bushings.

Another version of early gripper bushings was based on a thin sleeve deflected inwardly by external hydraulic pressure in such a way as to grip the shaft. The hydraulic pressure used with these bushings was high enough to flex the comparatively thin wall of the bushing. U.S. Pat. No. 4,269,229 to Falk and German Patent Application No. 25 179 97 to Kostyrka illustrate this type of gripper bushing.

Many of these early gripper bushing assemblies were used in applications which were slow cycling or slow acting. Typically, they were used as safety brakes for vertical presses, elevators, and the like, or as couplings for transmitting rotating forces on shafts. The service life of such a bushing according to one manufacturer was about 2 million cycles. While this service life is adequate for the above named applications, it is inadequate for molding machine applications in which 2 million cycles represent 10 months of operation on a molding machine running continuously at 5 cycles per minute. Such a relatively short service life is unacceptable in molding machines.

Gripper bushing assemblies have also been applied to the gripping of tiebars of injection molding machines. The earliest known use of such assemblies in injection molding machines is U.S. Pat. No. 3,183,555 to Siegel. In the Siegel apparatus, a deformable sleeve is part of the tiebar itself. The sleeve is deflected outwardly to grip the inside surface of a tiebar bushing held in a moving platen. Thus, the platen could be gripped quickly prior to clamping the mold with the main clamping unit. In order to grip the platen in a variety of stroke positions, the deformable sleeve extended a considerable length along the tiebar. A typical construction of the sleeve assembly is shown in FIG. 3 of the Siegel patent. In this construction, the sleeve engaged the tiebar by a series of interrupted thread portions. An alternative version of the Siegel assembly is shown in FIG. 4 of the Siegel patent. In this embodiment, a deformable bushing in the platen is used to grip the tiebar. The bushing is provided with a thread for engaging a similarly threaded portion of the platen.

French Patent No. 2,174,361 to Guerin and Japanese Patent Document No. 1-49088 to Japan Steel Works illustrates similar gripper bushing assemblies used in molding machines.

Gripper bushing assemblies have found wide acceptance in vertical molding machines and presses. U.S. Pat. No. 3,938,362 to Falk shows a gripper bushing used in a vertical press. A threaded engagement between the deformable sleeve and the outer portion of the bushing is shown in published PCT Application WO 88/07447 to Hauch. A similar arrangement is shown in Japanese Kokai No. 1-245999 to Kohtaki and in Japanese Kokai No. 2-172711 to Japan Steel Works. These references suggest that it is necessary to make the bonding strength between the deformable sleeve and the bush/piston powerful enough to endure a clamping counterforce reaction. Strength is increased by having the deformable sleeve and a clamp ram joined by screws or threads whose entire length is formed around the sleeve. In this way, the stress of the sleeve is presumably dispersed. However, these systems typically suffer from a fretting problem in which the lead threads are deformed or worn at a relatively high rate.

U.S. Pat. No. 4,509,910 to Petersen illustrates still another clamp assembly for use on vertical presses. The Petersen clamp design includes an inner clamp sleeve positioned concentrically about a column to be gripped. It further includes an outer sleeve secured to the crosshead assembly concentrically about the inner clamp sleeve. The inner and outer clamp sleeves are threadably secured together to limit longitudinal movement of one clamp sleeve with respect to the other. The outer clamp sleeve is secured to the crosshead so that it cannot move relative to the crosshead. Hydraulic fluid is introduced into a chamber formed between the opposing threads of the two sleeves in order to deform the inner sleeve against the column to be gripped. The deformable sleeve is preferably made from aluminum.

Petersen states in column 9, lines 31 through 35 of his patent that stress concentration is inherently "slipped out" at the friction interfaces of the column clamping assembly. Petersen states that this prevents progressive failure which is a common problem in long cylinder threaded joints. In other words, Petersen ignores the fretting problem which occurs in the prior art threaded systems.

Tests have indicated that simple (unthreaded) gripping sleeves prematurely wear at one end. This fact was recognized by the Siegel patent and the aforementioned Japanese patent publications. The use of a threaded engagement between the sleeve and the body of the bushing was an attempt to minimize the stress concentrations which occur. While these threads improve the situation, they can not uniformly distribute the stress along the length of the sleeve. In fact, they introduce new disadvantages.

The need for some mechanical interlocking between the deformable sleeve and a housing body in a two component assembly means that a thread must inevitably be used since any other means prevents assembly. One must bear in mind however that the space between the deformable gripper sleeve and the body is a pressure vessel or chamber subjected to very high pressures, typically 8,000 psi, needed to deform the thin sleeve inward to grip the tiebar. Thus, if the sleeve or the body are not each made in one piece, a problem of sealing the chamber to contain the pressure arises. Hence a threaded connection between the sleeve and the body permits assembly and maintains chamber integrity.

There are two disadvantages to the threaded approach. First, while helping transfer the stress from the sleeve to the body more uniformly, it does nothing to more evenly distribute the stress in the sleeve itself. Second, the thread considerably strengthens the inner sleeve by increasing its thickness by virtue of the male portion of the thread. The hoop strength of the sleeve is considerably increased requiring even higher pressures of hydraulic fluid to be used in order to deform the sleeve inwardly and develop sufficient friction to grip the tiebar. This is counterproductive in the design and increases the potential for leaking.

Accordingly, it is a principal object of the present invention to provide an improved gripper bushing construction.

It is a further object of the present invention to provide a gripper bushing construction as above for use in fast cycling applications.

It is yet a further object of the present invention to provide a gripper bushing construction as above for use in connection with injection molds, molding apparatuses and other devices.

These and other objects and advantages will become more apparent from the following description and drawings in which like reference numerals depict like elements.

SUMMARY OF THE INVENTION

The foregoing objects are achieved by the improved gripper bushing construction of the present invention. The gripper bushing construction may be used in a number of different applications where one desires to secure a member from movement relative to a cylindrical column. It has particular utility in an injection molding apparatus.

In a first embodiment, the gripper bushing construction comprises an elongated, flexible gripping sleeve positioned about a columnar member such as a tiebar. The sleeve is secured to a member such as a movable platen and is used to clamp the member to the column in a desired location. This is done by deforming the sleeve using fluid pressure so that the inner surface of the sleeve frictionally engages and grips the column.

In a first embodiment of the present invention, the gripper bushing further comprises one or more spacers intermediate the sleeve and the member being clamped. The spacers engage the sleeve via a mechanical interlock but are free to move relative to the member being clamped or gripped.

It has been found that the gripper bushing construction of the present invention is capable of accommodating any stretching of the column which may occur as a result of the application of clamping forces, i.e., mold clamping forces, to the member to which the sleeve is secured. This is possible because the sleeve and the spacer(s) are capable of stretching an amount substantially equal to the amount of stretching in the column. The gripper bushing construction of the present invention is capable of transmitting clamp reaction forces in the column to the member without generating high stress concentrations and without the need to use inordinately high fluid pressure to develop gripping friction.

In another embodiment, the gripping sleeve has a male thread along an outer surface. The male thread has a constant leading edge pitch and a constantly reducing width. The male thread engages a female thread on an inner surface of the member housing the sleeve. The female thread has a constant pitch and a constant width. When the sleeve and the member are in a relaxed condition, i.e., non-gripping mode, a constantly widening gap is created between the threads. This gap is substantially eliminated when any applied clamping forces cause stretching of the column and the sleeve. In this way, high stress concentrations are again avoided.

Further details of the present invention are set out in the following detailed description.

DETAILED DESCRIPTION OF THE DRAWINGS

Figure 1:
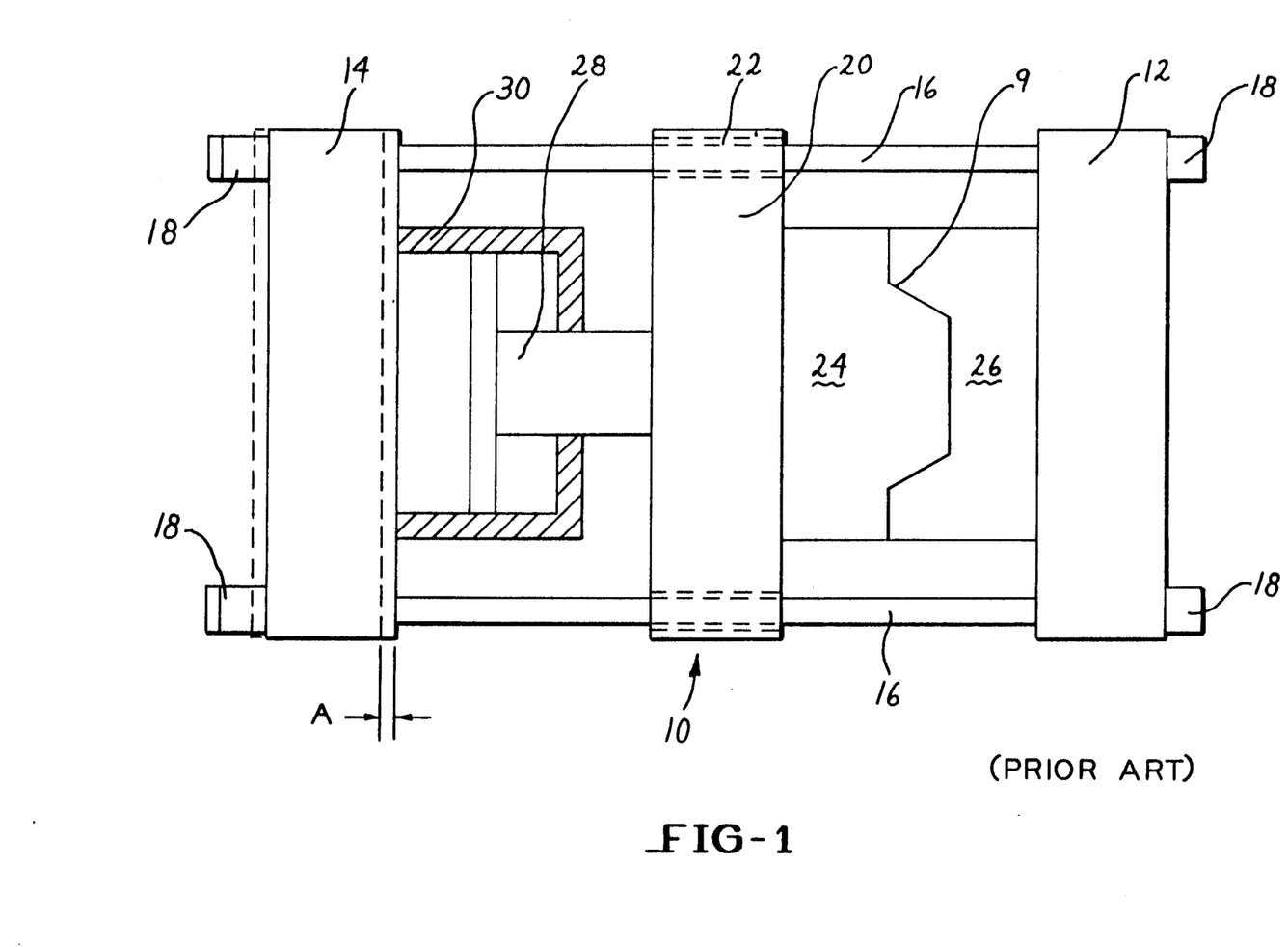
FIG. 1 is a schematic representation of a prior art horizontal injection molding machine.

Referring now to the drawings, FIG. 1 illustrates a basic horizontal injection molding machine having a mold clamping mechanism. The machine (10) consists of a fixed platen (12), a clamp block (14) and a plurality of tiebars (16) extending between the fixed platen (12) and the clamp block (14). In a typical molding machine, there are usually four tiebars extending between the fixed platen and the clamp block. The ends to the tiebars are retained by nuts (18) to prevent them from pulling through the fixed platen and the clamp block.

In between the fixed platen (12) and the block (14) is a sliding platen (20) having internal gripper bushing assemblies (22). The platen (20) slides along the tiebars between a mold open position (not shown) and the mold closed position shown in FIG. 1.

Mold halves (24) and (26) are connected to respective ones of the fixed platen and the sliding platen so as to form an operative mold for fabricating desired articles. When the mold formed by the mold halves is in a closed position, the mold halves are clamped together by operation of a hydraulic piston (28) acting inside a cylinder (30). The cylinder (30) is typically connected to the clamp block (14) while the piston (28) is connected to the sliding platen (20). When the mold is closed, high pressure fluid acts on one side of the piston (28) to generate a clamping force between the fixed and movable platens and hence between the mold halves.

The application of a clamping force in this manner creates a phenomenon known as tiebar stretch. This phenomenon results from the tiebars resisting the clamping force being generated between the fixed and moving platens. The tiebars transmit a resisting force or clamping reaction force to the clamp block (14) and hence the cylinder (30). The size of the piston, the pressure of the fluid being used to create the clamping force, and the diameter and length of the tiebars all have an effect on the amount of tiebar stretch which is generated. Typically, on a 250 ton clamp, a stretch of 0.040 inches is not uncommon. The tiebar stretch which occurs is shown schematically in FIG. 1 by the arrow "A" and the dotted position of the clamp block (14).

Since the tiebars (16) are of uniform cross section along the majority of the length, the stretch occurs uniformly along the length. For example, if the tiebar is 10 feet long and a total measured stretch "A" of 0.040 inches occurs, then this would amount to 0.000333 inches per inch of stretch on the tiebar. This fact becomes significant when considering the effect of gripping the tiebar with a deformable sleeve in place of the moving platen bushing (22).

Figure 2:
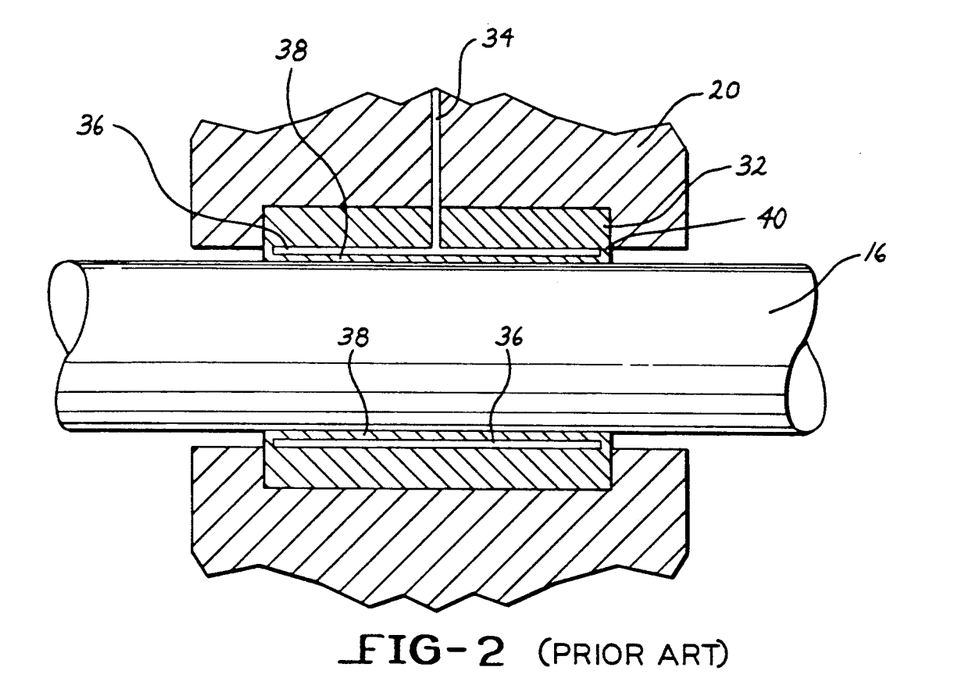
FIG. 2 is a sectional view of a prior art gripper bushing assembly which may be employed in the molding machine of FIG. 1.

FIG. 2 illustrates a plain gripper bushing (32) mounted rigidly inside the sliding platen (20) and through which passes one of the tiebars (16). High pressure fluid supplied through a channel (34) acts inside a chamber (36) to cause a thin wall section (38) of the bushing (32) to deform inwardly and grip by friction an outer surface of the tiebar (16). This type of bushing assembly is typically 12 inches in length. The tiebar (16) is relaxed when initially gripped because any gripping action by the bushing (32) must occur prior to any clamping action via the piston and cylinder can begin. Accordingly, after being gripped by the bushing (32), the tiebar is stretched inside the length of the gripper bushing. The wall section (38) or inner sleeve of the bushing (32) being of thin section and being in frictional contact with the tiebar will stretch the same amount as the tiebar. In a 12 inch long bushing assembly, this means that in the above example the inner sleeve and the tiebar will stretch about 0.004 inches.

As can be seen from FIG. 2, the remainder of the gripper bushing assembly (32) is comparatively thick. Additionally, it is rigidly held in the sliding platen (20). As a result, it does not deflect or stretch as much as the thinner portion (38). Accordingly, the easily stretching, thin portion is rigidly constrained by the thicker nondeflecting portion in the region marked by the reference number (40). Regions such as region (40) become high stress areas that tend to prematurely crack, particularly in welded constructions such as that shown in U.S. Pat. No. 4,264,229 to Falk. The tiebar (16) and bushing (32) in these constructions has been found to experience rapid wear adjacent the region (40).

Figure 3:
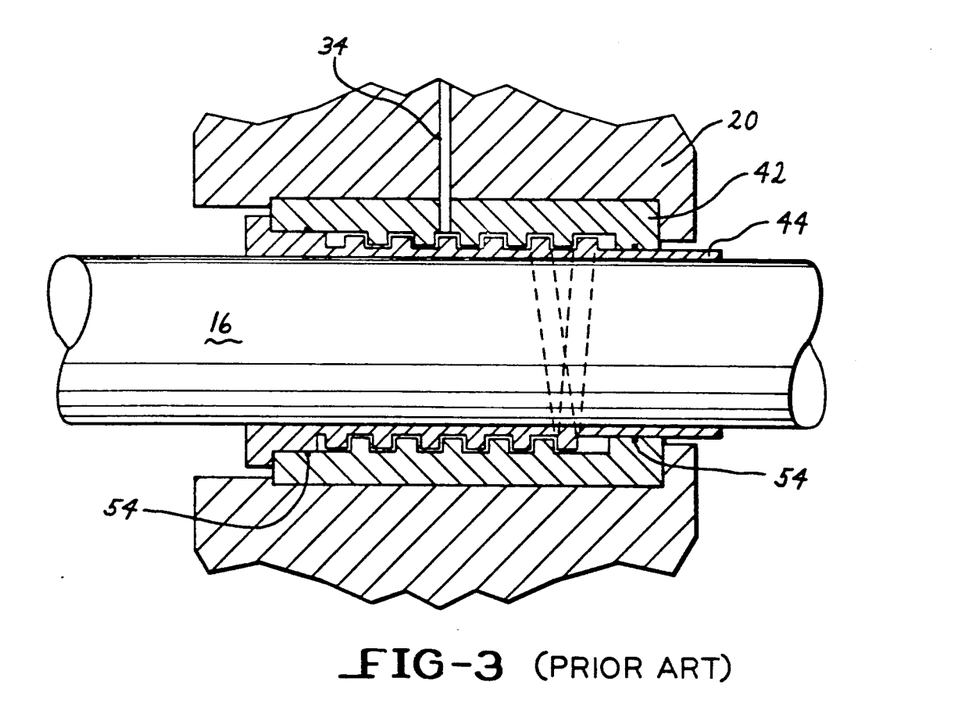
FIGS. 3 and 4 are sectional views of a prior art threaded gripper bushing assembly which can be employed in the molding machine of FIG. 1.
Figure 4:
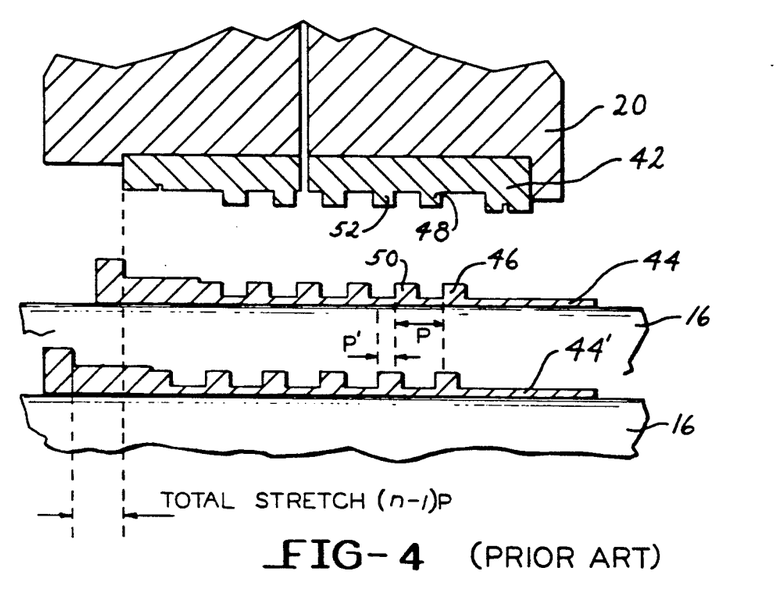

FIGS. 3 and 4 show a prior art bushing assembly which employs a threaded type of construction. The bushing assembly (42) has a threaded portion which engages a similarly threaded portion on an inner sleeve assembly (44). Fluid enters a space between the threads of the bushing assembly and the sleeve via a channel (34). The fluid entering the space causes the sleeve (44) to deflect inwardly and frictionally engage the tiebar (16). In this type of assembly, the bushing and the sleeve are rigidly mounted within the sliding platen (20).

Once again, one must consider the effect of stretching the comparatively thinner sleeve (44) after it has gripped the tiebar (16). FIG. 4 compares the effect of tiebar stretch on the male thread of the sleeve (44). In the unstretched state of the tiebar, when gripping action is initiated, the male thread pitch P on the sleeve (20) is the same as the female thread pitch P on the bushing (42). This is necessary in order to assemble the sleeve into the bushing in the first place.

If the sleeve (44) were free to stretch the same amount as the tiebar, then the male pitch P would increase by an amount P' for the second thread (50) and 2×P' for the third thread up to (n−1)×P' for the end thread, that is an accumulative amount along the threaded length. Instead of a constant pitch thread, the thread would then be a thread with a constantly increasing pitch.

The sleeve is not free however to stretch since the first thread (46) is restrained by its corresponding female portion (48) in the rigid bushing and will only stretch a fraction of P'. The second thread (50) is similarly restrained and any deflection of female portion (48) under the load of the male thread (46) will cause male thread (50) to bear on its corresponding female portion (52) which will absorb this residual stress. Thus the remaining portion of the sleeve will not stretch significantly and will in fact slide on the tiebar (16). The threads beyond the first couple will accordingly not be stressed.

This phenomenon, where most of the stress is transmitted between two threaded components occurs in the first two or three threads, is well known. In fact, a similar phenomenon can be found in the assembly of the tiebar nuts (18) to the tiebar ends. It has been found that the small local deformation of the thread surfaces causes fretting and ultimately seizing between the first threads. Fretting may also occur between the sleeve and the tiebar in the section where they slip relative to each other. Furthermore the increased fluid pressure to overcome the stiffer sleeve and generate gripping action to the tiebar is a serious concern which increases the likelihood of leakage at the seals (54).

For sometime now, an arrangement has been needed whereby the thin sleeve portion of a gripper bushing assembly can stretch substantially the same amount as the tiebar which it surrounds and whereby the clamp reaction forces in the tiebar can be transmitted through the gripping sleeve to the rigid moving platen without the generation of high stress concentrations and without the need to sue inordinately high fluid pressure to develop griping friction. It is believed that the gripper bushing assemblies of the present invention provide such an arrangement.

FIGS. 5 through 8 illustrate novel gripper bushing assemblies which employ a floating element or spacer to achieve the foregoing results. The gripper bushing assembly shown in FIGS. 5 and 6 have an elongated flexible inner sleeve (56) preferably formed from steel. The sleeve (56) has a plurality of concentric local ribs (58) for load transmission. The gripper bushing assembly further includes at least two spacers (60, 62). The spacers substantially surround the sleeve (56) and have a series of grooves (64) which engage the ribs (58). This gripper bushing assembly is slid into the moving or sliding platen (20) and retained by bolts (66) through the end flange (68) portion of the sleeve (56). High pressure fluid is supplied through the channel (70) to cause the sleeve (56) to deform and grip the tiebar (16) by friction.

Figure 5:
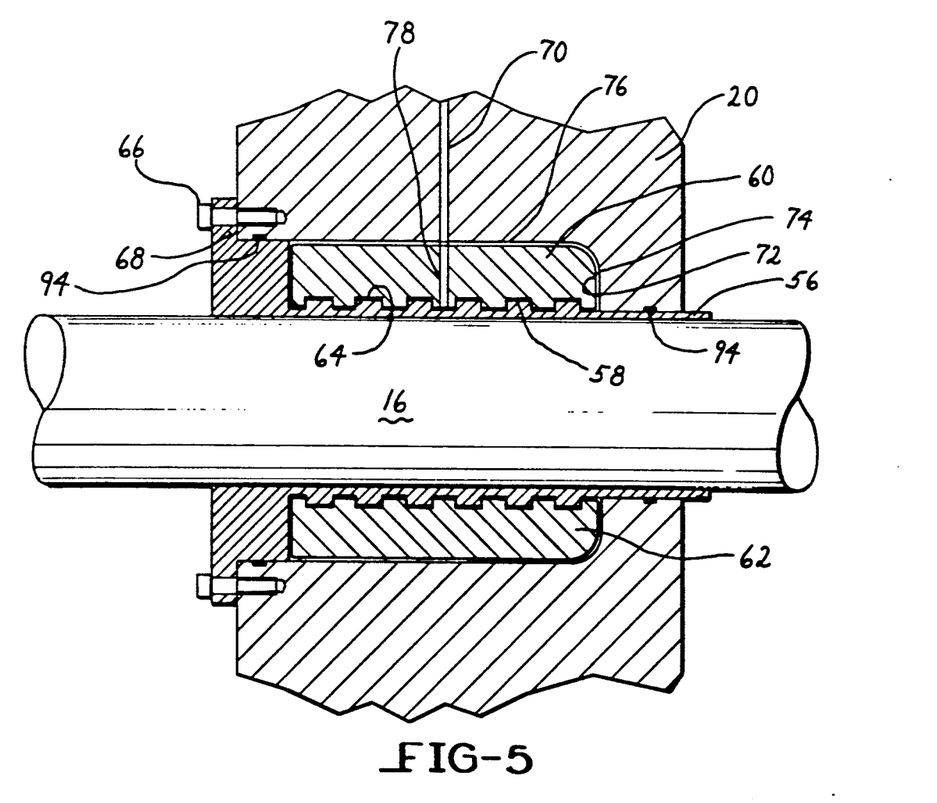
FIGS. 5 and 6 are a sectional view of a first embodiment of an improved gripper bushing construction in accordance with the present invention.
Figure 6:
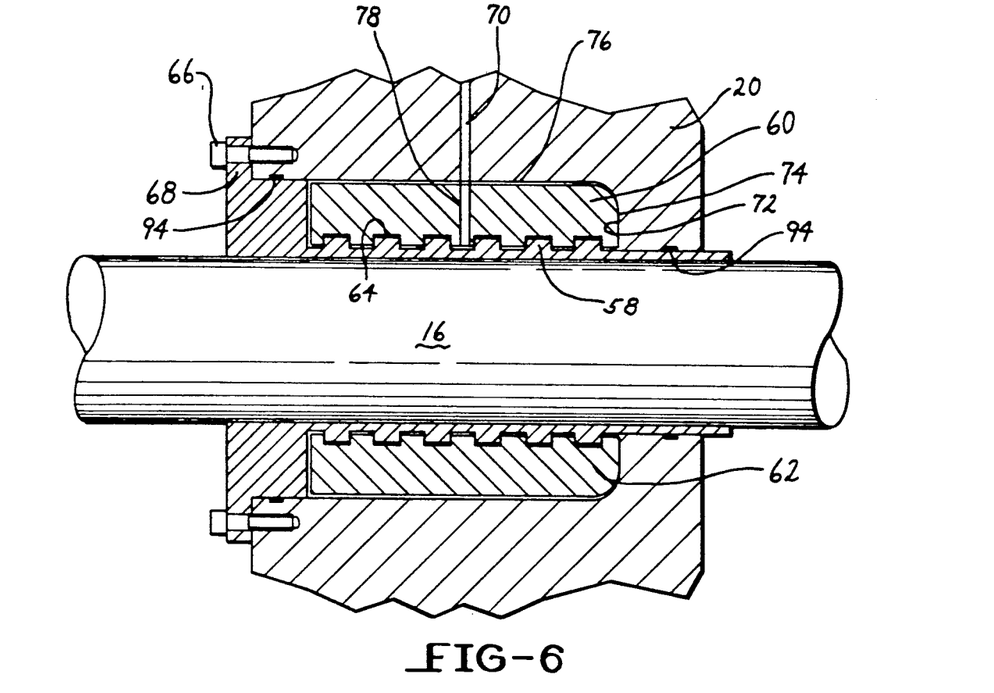

It has been found that the mechanical interlocking between the spacers (60, 62) and the sleeve (56) permits the sleeve to stretch axially in a longitudinal direction substantially the same amount as the tiebar (16) stretches in response to the application of the clamping forces generated by the piston and cylinder (28, 30) because of the clearance at the ends of the spacers (60, 62) in the platen (20). Additionally, the cross section area of the spacers (60, 62) is the same as the combined cross section of the tiebar (16) and the rib (58) so that an equal stress occurs, thus causing equal stretching of the sleeve (56) inside spacers (60, 62). As a result, no fretting occurs between the ribs (58) and the grooves (64). It has also been found that the spacers (60, 62) stretch an amount similar to the stretching of the sleeve (56) and the tiebar (16). As a result, the tiebar reaction force is successfully transmitted to the platen (20) at the end face (72) of the spacers when the spacers contact the corresponding bore end wall (74) in the platen (20). This phenomenon is shown in FIG. 6.

It should be noted that the spacers (60, 62) need not contact the bore surface (76) in the platen (20). Clearances at both ends of the spacers and between their side faces as well as the channel (78) insure that the high pressure fluid can act directly on the sleeve (56) to cause it to deflect and grip the tiebar. Since both the sleeve (56) and the spacers (60, 62) are free to stretch axially after gripping the tiebar, slippage and consequential fretting on any of their surfaces is minimized. After stretching, the clearance at the end of the spacers is taken up and the compressive reaction force is transmitted directly to the platen (20) through the bore end (74).

Figure 7:
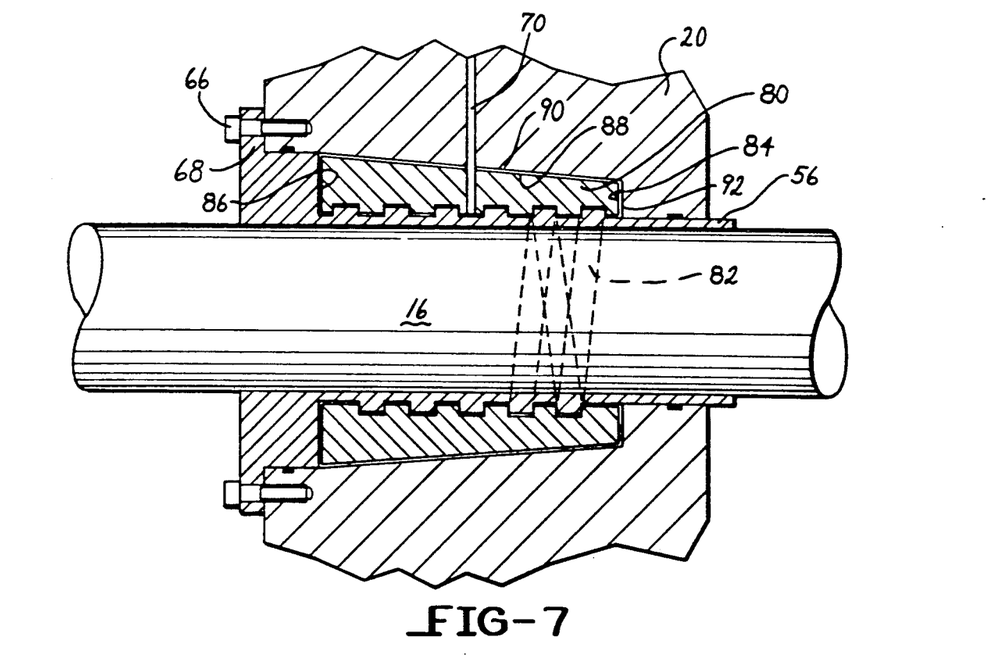
FIGS. 7 and 8 are a sectional view of an alternative embodiment of a gripper bushing construction in accordance with the present invention.
Figure 8:
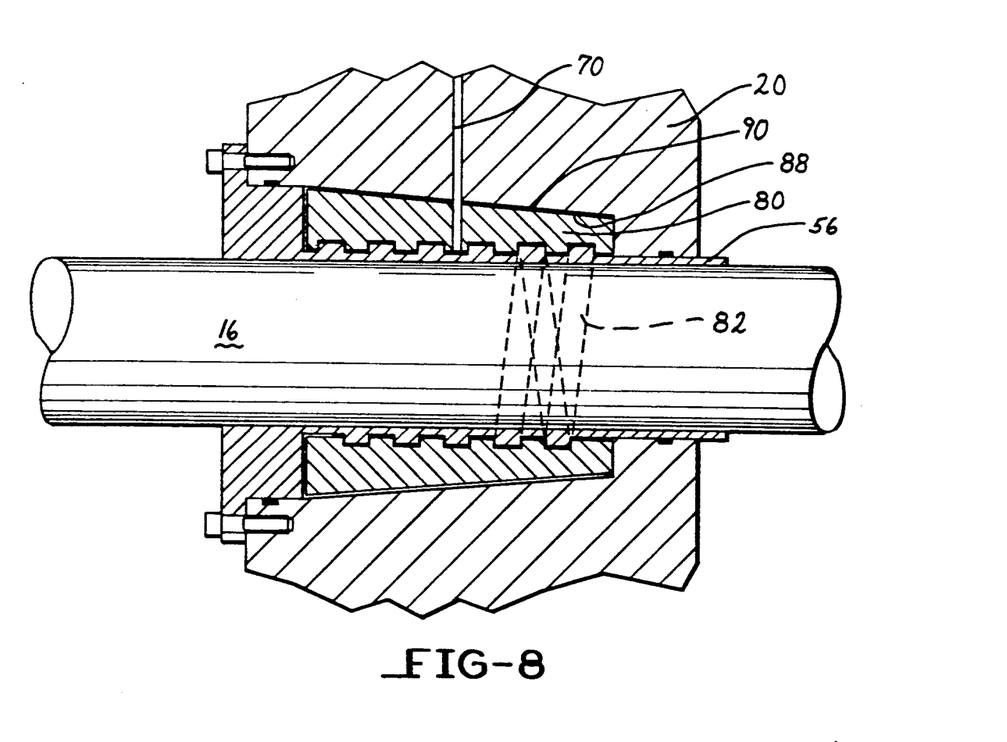

FIGS. 7 and 8 illustrate an alternative embodiment of a gripper bushing assembly in accordance with the present invention in which a single spacer (80) is connected to the sleeve (56) by means of a continuous thread (82). The spacer (80) is frustoconically shaped so that its outer diameter continually increases from a narrow end (84) to a wider end (86). The shape of the spacer (80) equally distributes the stress evenly along the threaded connection. This avoids the problem of fretting and/or seizing which can occur when the stresses are confined to the first two or three threads of a threaded connection.

As before, the outer surface (88) of the spacer (80) need not contact the bore surface (90 in the platen (20). Additionally, in a relaxed condition when gripping action is about to incur, a clearance exists between the spacer (80) and its ends (82, 84) and the bore end wall (92) of the platen (20). As before, stretching of the sleeve results in the taking up of these clearances and transmission of the compressive reaction force directly to the platen (20) through the bore end (92) as shown in FIG. 8.

In a variation of the present invention, one can construct the gripper bushing assembly to be double acting. By increasing the size or the number of the bolts (66) or by blocking the sleeve flange (68) by additional external structure rigidly attached to the platen, the axial reaction force can be transmitted via either end of the assembly to the platen.

The gripper bushing assemblies shown in FIGS. 5 through 8 permit an inner sleeve frictionally engaging a tiebar to stretch uniformly while transmitting the tiebar clamp reaction force to the sliding or moving platen. The pressure chamber can be contained within the sleeve (56) and the platen (20) and sealed with conventional seals (94) so that there is no increased risk of leaking. Furthermore, it should be noted that the sleeve (56) is not greatly strengthened by the addition of the ribs (58). The minimum number and smallest configuration (cross section area) of ribs (58) can be used that is sufficient to transmit the tiebar clamp reaction force. Alternatively, the ribs on the sleeve (56) can be cut longitudinally (parallel to the tiebar axis) to drastically reduce their hoop strength. It is clear therefore that this arrangement can be used to optimize the function of the gripper bushing.

Figure 9:
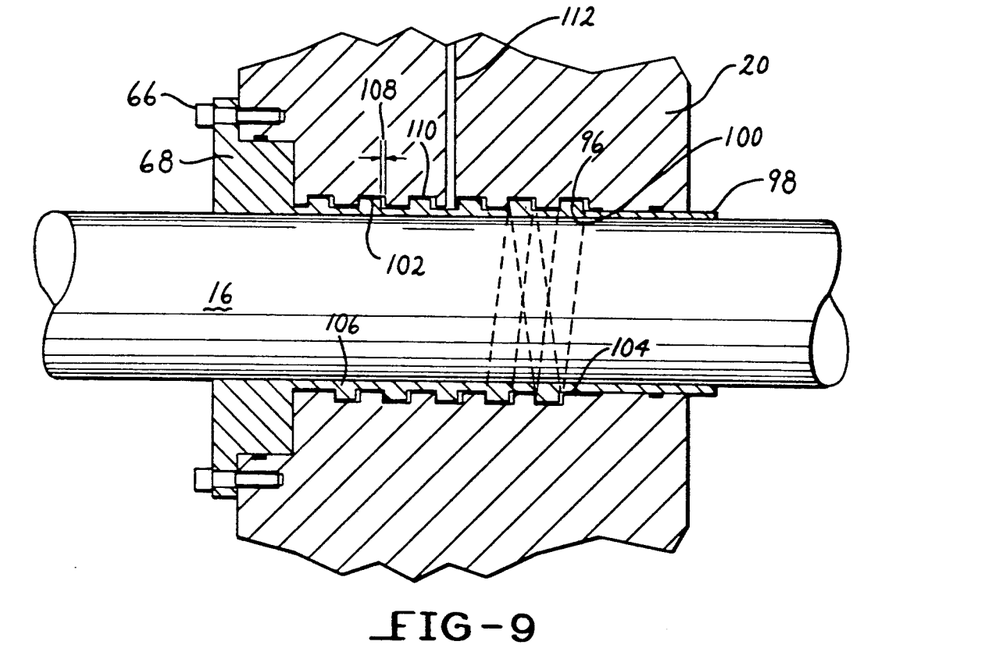
FIGS. 9 and 10 are a sectional view of a third alternative embodiment of a gripper bushing construction in accordance with the present invention.
Figure 10:
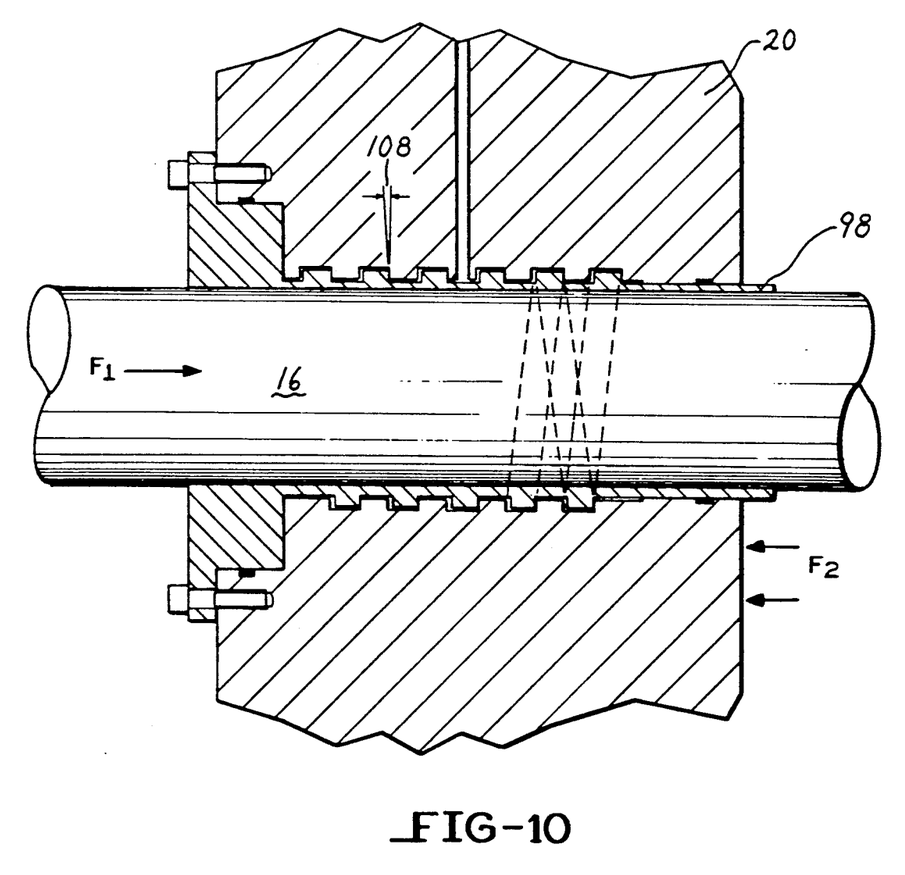

FIGS. 9 and 10 illustrate another embodiment of a gripper bushing assembly for dealing with the tiebar stretch problem. When the forces $F_1$ and $F_2$ act upon the tiebar (16) and the platen (20) as shown, the gripper bushing assembly illustrated in this figure differs from the foregoing assemblies in that it does not employ any spacers. Instead, the sliding platen (20) is provided with a female thread (96) which in the unstretched condition has a constant pitch and constant width. The elongated, flexible griper sleeve (98) surrounding the tiebar (16) is provided with a male thread (100) which has a constant leading edge pitch but constantly reducing thread width (102) as one moves from a leading end portion (104) of the thread to a trailing end portion (106). This arrangement creates a constantly widening gap (108) between the sleeve (98) and an inner bore wall (110) of the platen (20). This also forms a constantly wideningly helical groove into which high pressure fluid such as oil can be fed via a channel (112). As the tiebar (16) stretches as a result of the clamping forces, the inner sleeve (98) stretches uniformly. This can be seen in FIG. 10 of the drawings. The gap (108) between the male and female threads is substantially eliminated as this stretch occurs at the rated tonnage of the gripping assembly. At this tonnage, each thread is equally loaded at the stretched tiebar geometry. The threads are not unequally stressed or required to absorb any offset thereby greatly minimizing the risk of fretting corrosion between the components.

As in the other embodiments of the present invention, the flexible sleeve (98) is preferably formed from a steel or iron alloy.

It can be seen through the foregoing discussion that the gripper bushing assemblies of the present invention successfully deal with the problem of tiebar stretching without incurring such problems as fretting corrosion and seal leakage. While the various embodiments have been described in the context of gripping the tiebars of injection molding machines, these assemblies can be used in other similar applications such as gripping the column of an injection molding machine or similar rods or shafts in injection molds or other moving machinery. For example, the assemblies of the present invention may be employed in vertical press devices.

It is apparent that there has been provided in accordance with this invention a gripper bushing construction which fully satisfies the objects, means, and advantages set forth hereinbefore. While the invention has been described in combination with specific embodiments thereof, it is evidence that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A clamping apparatus which comprises:
   a stationary platen;
   a plurality of tiebars connected to said stationary platen;
   a movable platen which travels along said tiebars;
   said movable platen having at least one gripper bushing assembly incorporated therein for fixing said platen in a desired position along said tiebar;
   each said gripper bushing assembly comprising an elongated, flexible sleeve surrounding a portion of one of said tiebars and at least one spacer positioned between said sleeve and a portion of said movable platen; and
   said at least one spacer being axially movable relative to said movable platen.

2. The apparatus of claim 1 further comprising:
   means for deforming said sleeve so as to grip said tiebar portion.

3. The apparatus of claim 2 further comprising:

means for applying a clamping force to said movable platen; and said clamping force causing a stretching of said one of said tiebars and a substantially equal stretching of said sleeve, whereby said sleeve transmits clamp reaction forces in said one of said tiebars to said movable platen without generating high stress concentrations.

4. The apparatus of claim 3 wherein each said gripper bushing assembly further comprises:
   a mechanical interlock between said sleeve and said at least one spacer; and
   said mechanical interlock permitting said at least one spacer to stretch an amount equal to the stretching of said sleeve and said tiebar portion.

5. The apparatus of claim 4 wherein said mechanical interlock comprises a series of concentric local ribs on said sleeve and a series of grooves in said at least one spacer for engaging said ribs.

6. The apparatus of claim 4 wherein said mechanical interlock comprises a continuous thread on said sleeve.

7. The apparatus of claim 1 wherein each said spacer has an increasing outer diameter.

8. An apparatus for making plastic articles which comprises:
   a stationary platen;
   a plurality of tiebars connected to the stationary platen;
   a movable platen which travels along said tiebars between an open and a closed position;
   means for applying a clamping force to said movable platen when said movable platen is in said closed position;
   means for positioning said movable platen in a substantially fixed location prior to applying said clamping force;
   said platen positioning means comprising means for gripping a portion of one of said tiebars and for transmitting reaction forces in said tiebar portion to said movable platen resulting from application of said clamping force without generating high stress concentrations; and
   said gripping means comprising means for accommodating any stretching of said tiebar portion resulting from said applied clamping force and for substantially avoiding fretting in said gripping means.

9. An apparatus for making plastic articles which comprises:
   a stationary platen;
   a plurality of tiebars connected to said stationary platen;
   a movable platen which travels along said tiebars between an open and closed position;
   means for applying a clamping force to said movable platen when said movable platen is in said closed position;
   means for positioning said movable platen in a substantially fixed location prior to applying said clamping force;
   said platen positioning means comprising means for gripping a portion of one of said tiebars and for transmitting reaction forces in said tiebar portion to said movable platen resulting from application of said clamping force without generating high stress concentrations;
   said gripping means accommodating any stretching of said tiebar portion resulting from said applied clamping force and comprising an elongated flexible sleeve for frictionally engaging and griping said tiebar portion;
   said sleeve having a male thread on an outer surface;
   said male thread having a constantly reducing width and a constant leading edge pitch;
   female threads on an inner wall of said movable platen;
   said female threads having a constant pitch and a constant width; and
   said reducing width threads on said sleeve and said constant width threads on said movable platen forming a constantly widening gap for accommodating stretching of said sleeve.

10. An apparatus for making plastic articles which comprises:
    a stationary platen;
    a plurality of tiebars connected to said stationary platen;
    a movable platen which travels along said tiebars between an open and a closed position;
    means for applying a clamping force to said movable platen when said movable platen in said closed position;
    means for positioning said movable platen in a substantially fixed location prior to applying said clamping force;
    said platen positioning means comprising means for gripping a portion of one of said tiebars and for transmitting reaction forces in said tiebar portion to said movable platen resulting from application of said clamping force without generating high stress concentrations;
    said gripping means accommodating any stretching of said tiebar portion resulting from said applied clamping force and comprising an elongated sleeve for frictionally engaging and gripping said tiebar portion and at least one spacer positioned intermediate said sleeve and an inner wall of said movable platen, said at least one spacer being movable with said sleeve and relative to said inner wall of said movable platen.

11. A gripper bushing assembly for securing a member from relative longitudinal movement with respect to a cylindrical column which comprises:
    an elongated, flexible sleeve positioned about said column and slidable with respect thereto;
    said sleeve being secured to said member and serving to fix said member in a substantially fixed position relative to said column when in a deformed state; and
    at least one spacer intermediate said sleeve and said housing which can move relative to said housing.

12. The gripper bushing assembly of claim 11 further comprising:
    said column being stretched by applied forces; and
    said sleeve being free to stretch an amount substantially equal to the amount that a portion of said column surrounded by said sleeve stretches so as to permit the transmission of reaction forces in the column to the member through said sleeve without generating high stress concentrations and without the need to use inordinately high fluid pressure to develop gripping friction.

13. The gripper bushing assembly of claim 12 further comprising:
    a mechanical interlock between said sleeve and at least one spacer; and said mechanical interlock permitting said at least one spacer to stretch an amount equal to the stretching of said sleeve and said column portion.

14. The gripper bushing assembly of claim 13 wherein said mechanical interlock comprises a series of concentric local ribs on said sleeve and a series of grooves in said at least one spacer for engaging said ribs.

15. The gripper bushing assembly of claim 11 further comprising:
   at least two spacers surrounding said sleeve.

16. The gripper bushing assembly of claim 11 further comprising:
   means for supplying fluid to a space between said sleeve and said at least one spacer to cause said sleeve to deform and frictionally grip said column.

17. The gripper bushing assembly of claim 16 further comprising:
   each said spacer having two opposed side faces spaced from surrounding spaces of said member so as to define two outer fluid channels; and
   said fluid channels forming part of said fluid supply means.

18. The gripper bushing assembly of claim 13 wherein said mechanical interlock comprises a continuous thread on said sleeve.

19. The gripper bushing assembly of claim 11 wherein each said spacer has a frustoconical shape.

20. A gripper bushing assembly for securing a member from relative longitudinal movement with respect to a cylindrical column which comprises:
   an elongated, flexible sleeve positioned about said column and slidable with respect thereto;
   said sleeve serving to position said member in a substantially fixed position relative to said column when said sleeve is in a deformed state;
   means for transmitting reaction forces in said column to said member through said sleeve;
   said transmitting means comprising a female thread in said member, said female thread having a constant pitch and a constant width; and
   said transmitting means further comprising a male thread on said sleeve, said male thread having the same pitch as the female thread and a constantly reducing width.

21. The gripper bushing assembly of claim 20 further comprising:
   said reducing width threads on said sleeve and said constant width threads on said member forming a constantly widening helical groove as one moves from a first end of said member to a second end of said member.

22. The gripper bushing assembly of claim 21 further comprising:
   means for feeding fluid under pressure into said helical groove so as to cause said sleeve to deform and grip said column.

23. The gripper bushing assembly of claim 22 wherein:
   said threads on said sleeve and member form a constantly widening gap when said sleeve is in a relaxed condition; and
   said gap being substantially eliminated when said reaction forces cause stretching of said column and a substantially equal stretching of said sleeve.

* * * * *

UNITED STATES PATENT AND TRADEMARK OFFICE
CERTIFICATE OF CORRECTION

PATENT NO. : 5,129,817
DATED : July 14, 1992
INVENTOR(S) : Ronald Ing, et. al.

It is certified that error appears in the above-indentified patent and that said Letters Patent is hereby corrected as shown below:

Column 6, line 33, delete "sue" and insert --use-- in its place.

Column 6, line 34, delete "griping" and insert --gripping-- in its place.

Column 10, claim 9, line 1, delete "griping" and insert --gripping-- in its place.

Signed and Sealed this

Nineteenth Day of October, 1993

Attest:

BRUCE LEHMAN

Attesting Officer     Commissioner of Patents and Trademarks